9770X
F. Groening,
Ironing Hats.
No.
Patented June 25. 1836.
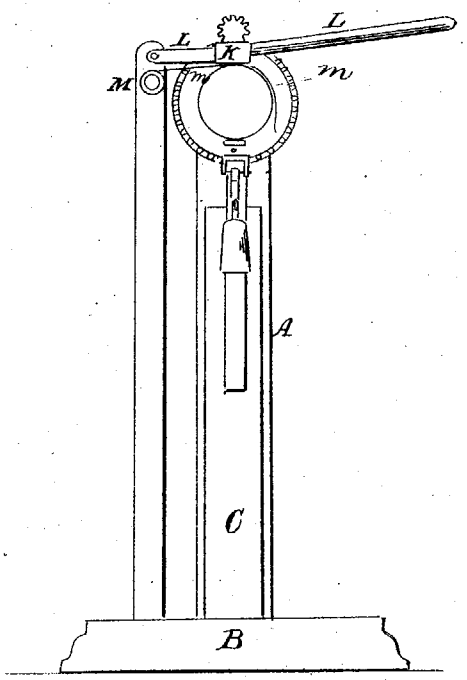
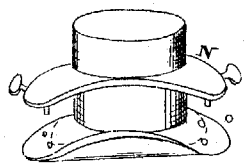
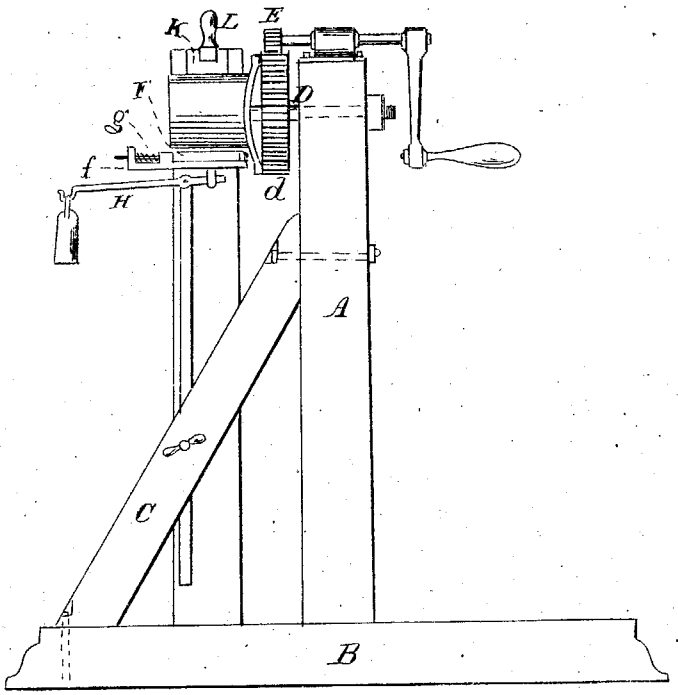

June 25. 1836 141 of Frederick Groening of Brooklyn. New York. 9770X

Letters Patent.

The schedule referred to in these Letters Patent, and making part of the same
containing a description in [illegible] of the said Frederick Groening of his improve
ment in the manufacture of Palm [illegible] of hats.

To all to whom these presents shall come,

Be it known that I Frederick Groening of the town of Brooklyn in the county
of King and the State of New York, have invented a new and useful improvement
in the Manufacture of Palm leaf hats, and in certain machinery for pressing and
finishing the same, and that the following is a full and exact description of the
said improvement.

The inner part of the rim or palm leaf hat; as they have hitherto been manu
factured, or more properly the junction of the crown and rim forms a circle,
and the rim itself is perfectly flat; any variation from this shape which we [illegible]
being produced by the pressing when these hats are put on owing to the oval
shape of the head, the front and back part of the rim are forced downward to the
annoyance of the wearer, obstructing the view &c. and the shape of the hat other
-wise disfigured, the defect increasing in proportion as the hat is worn and assumes
the original shape from which it had been forced by pressing, my improvement is
intended to obviate this defect; and consist in braiding the hats so as to make the
junction of the rim and crown an elipse instead of a circle, and also to dish or
arch the rim on its lower side from front to rear. This is effected by using an
oval block and working into the rim by the 4 quadrants of its circumference, an
additional number of splits proportionable to the excentricity of the elipse or oval
and the required dish which any one aquainted with this kind of work will
sufficiently understand & be able to put into practice. The machinery for pressing
and finishing consists of several parts as follows.

The first is the machine for pressing the crown a strong upright timber is ten
oned into a sill piece or frame that rests upon the floor, the upright being braced
from the sill towards the side on which the pressing is performed, through the
upright is passed, a stationary iron spindle confined by a nut on one side and

9770X and projecting sufficiently far on the other to receive and sustain an iron cog wheel
with a socket at its centre (attached to the wheel) that enters the hat block,
and forms the main bearing; the socket and spindle should enter deep into the block
and the diameter of the latter upon which the socket plays freely, should be about
3 inches the better to sustain the pressure the the block being secured to the
socket by wedges or otherwise, on the face of the cogwheel is a short lock pin that
enters the block and causes it to revolve with the wheel, also two small arms
project horizontally from the same face of the wheel diametrically opposite to
each other, to ends of which are secured by thumb screws by which their length
are regulated, two hooked slides which catch the margin of the rim of the hat
the latter being secured by screw nuts between two plates of metal, conforming
very nearly to its shape and hold the hat on the block, A small spur wheel
immediately above the cog wheel and which matches into it, has its bearing or
shaft running into a suitable box, on the top of the upright and to this shaft
is attached the crank by which the machine is operated, the diameter of
the wheels may be varied so as to suit the power and speed. Immediately
under the hat blocks is the sponge, by which the hat is kept in a proper state,
of humidity for the operation of pouncing; it consists of a metal or wooden
slide, to the upper side of which the sponge is attached. This slide rests upon a
strap of metal the end of which under the hat or block has a slot or groove
in which work a guide pin or screw fixed in the under side of the slide,
the other end of the slide being guided by a pin that passes through a hole
in a rectangular arm raised on the strap, the object of the sliding motion
being to keep the sponge close to the rim of the hat, whilst revolving to
effect which a spiral spring is placed on the guide pin between the arm and
slide also the end of the slide next to the hat rim is beveled from the under
side to support the sponge &c and cause it to press on the hat during its
revolution, It is connected with the short arm of a weighted lever im-
mediately under it by a pin that passes through two short [illegible] on the
lower side of the strap thus forming at the same time a joint or hinge the
lever having its fulcrum in an upright iron rod or bar that passes through the
brace of the upright, which is moveable up and down, and is made stationary
by a thumb screw, in the side of the brace; by this means the pressure

9770X of the sponge may be regulated, and it will adjust itself to hats of different tapers &c. The iron is a square box the length of which is nearly equal to the height of the crown of the hat; the bottom next to the rim of the hat projecting a short distance is pressed during the operation against one of the plates which incloses the rim and the iron following the inflections or dick of the rim, has a lateral motion that causes it to operate on every part of the crown contiguous to the rim without injury to the latter.

A short arm projects from one side of the box, the end of which is connected by a pin to the top of a post at the side of the machine opposite the block, and a long handle at the opposite side, the arm and handle forming together a lever situated transversely across the block, by bearing on the end of which with the hand or by weights whilst the hat is in revolution, the required degree of pressure of the iron is produced a hot iron bolt or heater of which there may be several having been first introduced into the box, also the same posts with the iron is hooked or attached by a roller or cotton cloth that is spread on the hat before the iron is applied for the purpose of protecting it from the dust &c. and removing any extra moisture obtained from the sponge, I prefer the roller upon which the cloth may be wound as it becomes too much soiled for use by which means a clean part of it may be always brought under the iron and much trouble in shifting cloths saved. For pressing the tip of the crown, as also the brim, I employ heated cast iron moulds, For the first a circular flat mould with a round depression large enough to admit an ordinary hat; is used, the hat is first put on a solid block or thin smooth plate of metal being first interposed between the tip and block. It is then set upright in the mould heated to the proper degree which the experience of the workman will dictate after which the whole is submitted to a very heavy pressure, by any of the presses in common use for a sufficient length of time to produce the desired effect.

The moulds in which the brims are pressed, are also of cast iron made very heavy so as to retain the heat — the lower mould is oval and of the shape of which it is designed the rim shall have the upper mould conforms to the lower one exactly except that a large circular opening is left in the middle which admits the crown of the hat to pass through it they are also both cast with ears or handles for the convenience of lifting and
are likewise supplied with match pins, the hat being placed crown up
on the lower mould (which is heated) a thin plate of metal of which
there are several to fit hats of different sized crowns and rims is placed
on top of the rim having the same inflections as the mould, the upper mould
also heated is then put on and the whole submitted to a heavy pressure
as before. The lower mould is also used in connection with a cast iron
mould having the same breadth as the rim, to press into proper shape rims
made of thick paper which are to be put between the under side of the
rim and its lining when the hat is trimmed, for the purpose of stiffen
ing it. Before removing the paper rim from the upper mould its
inner edge which projects past the mould for the purpose, is notched or slit
after which a proper shaped block is forced through from the under side which
turns up said edge and perfectly adapts the rim, to the hat,
The paper rims should be broad enough to project past the outer cir-
cumference of the hat rim, to be trimmed off when the hat is bound, after
pressing the hats are to be lined and trimmed in the usual manner.
Now what I claim as new and as my invention for which
I ask Letters Patent, is the method herein set forth of bending the junction
of the rim and crown of the hat oval instead of round, and arched from
front to rear, I also claim the heated cast iron moulds used in the
manner herein described, and likewise the machine for ironing the
crowns so far as regards the application of the sponge and its construc-
tion; the cog and spur wheels together with the hooks and plates en-
closing the rim by which the hat is held on the block, not meaning
to claim hereby the principle of a revolving block which has already
been used for similar purposes.
Given under my hand at the city of Washington this
[illegible] 2nd day of May 1836 ——
[illegible] Witnesses Fred. Gopening
Wm. T. Steiger
B. K. Morsell
Drawing made [1833 words